(12) United States Patent
Skrzypchak et al.

(10) Patent No.: US 9,376,193 B1
(45) Date of Patent: Jun. 28, 2016

(54) MARINE OUTBOARD ENGINE ANGULAR POSITION LIMITATION SYSTEM AND METHOD

(75) Inventors: Mark J. Skrzypchak, Pleasant Prairie, WI (US); Matthew Rasmussen, Milwaukee, IL (US)

(73) Assignee: BRP US INC., Sturtevant, WI (US)

( * ) Notice: Subject to any disclaimer, the term of this patent is extended or adjusted under 35 U.S.C. 154(b) by 214 days.

(21) Appl. No.: 13/484,515

(22) Filed: May 31, 2012

Related U.S. Application Data

(60) Provisional application No. 61/491,642, filed on May 31, 2011.

(51) Int. Cl.
*B63H 20/10* (2006.01)
*G05B 19/401* (2006.01)

(52) U.S. Cl.
CPC .............. *B63H 20/10* (2013.01); *G05B 19/401* (2013.01)

(58) Field of Classification Search
CPC ...... B63H 201/10; B63H 20/08; B63H 21/26; B63H 21/265; F02B 61/045; G05B 19/401
USPC ............................................... 440/61 T, 61 G
See application file for complete search history.

(56) References Cited

U.S. PATENT DOCUMENTS

| 4,005,674 | A | 2/1977 | Davis |
| 5,037,338 | A | 8/1991 | Anderson et al. |
| 7,059,922 | B2 | 6/2006 | Kawanishi |
| 7,156,709 | B1 * | 1/2007 | Staerzl et al. ............... 440/61 T |
| 7,354,325 | B2 | 4/2008 | Mizuguchi et al. |
| 7,404,369 | B2 | 7/2008 | Tracht et al. |
| 7,462,082 | B2 * | 12/2008 | Kishibata et al. ................. 440/1 |
| 7,549,901 | B2 | 6/2009 | Mizuguchi et al. |
| 7,699,673 | B2 | 4/2010 | Kawanishi et al. |
| 7,769,504 | B2 * | 8/2010 | Kaji ............................... 701/21 |
| 2008/0085640 | A1 * | 4/2008 | Ishida et al. ...................... 440/1 |
| 2008/0233812 | A1 * | 9/2008 | Kawanishi et al. ............... 440/1 |
| 2008/0261469 | A1 | 10/2008 | Mizuguchi et al. |
| 2010/0151750 | A1 | 6/2010 | Ito |
| 2011/0281477 | A1 * | 11/2011 | Inoue et al. ........................ 440/1 |

FOREIGN PATENT DOCUMENTS

JP 04003594 B2 11/2007

OTHER PUBLICATIONS

English Abstract of JP04003594, Published Nov. 7, 2007; Retreived from the internet: http://worlwide.espacenet.com on May 17, 2013.

* cited by examiner

*Primary Examiner* — Andrew Polay
(74) *Attorney, Agent, or Firm* — BCF LLP

(57) ABSTRACT

A method for limiting motion of at least one outboard engine of a watercraft to at least one desired limit position in at least one direction is disclosed. The method comprises initiating a calibration process by inputting a sequence of at least one state of at least one switch, moving the at least one outboard engine about at least one axis in the at least one direction until the at least one desired limit positions is reached, sensing a position of the at least one outboard engine about the at least one axis when the at least one outboard engine is at the at least one desired limit position, and recording the sensed position to be a limit position. A method for limiting motion of a plurality of outboard engines, and a watercraft are also disclosed.

12 Claims, 9 Drawing Sheets

MARINE OUTBOARD ENGINE ANGULAR POSITION LIMITATION SYSTEM AND METHOD

CROSS REFERENCE

The present application claims priority to U.S. Provisional Patent Application No. 61/491,642 entitled "MARINE OUTBOARD ENGINE ANGULAR POSITION LIMITATION SYSTEM AND METHOD" filed on May 31, 2011, the entirety of which is incorporated herein by reference.

FIELD OF THE INVENTION

The present invention relates to systems and methods for limiting angular motions of one or more outboard engines of watercraft.

BACKGROUND

Typically, a marine outboard engine can be displaced about a vertical axis to steer the watercraft, and about a horizontal axis to tilt and trim the outboard engine.

When rigging the watercraft, the user has to set the maximum steer and tilt positions. The maximum steer and tilt positions are chosen so that the cowling of the outboard engine does not abut with the deck of the watercraft. In the case of the watercraft having multiple outboard engines, for example, the maximum steer position is also set so that the outboard engines do not interfere with each other during steering maneuvers.

Currently, the methods to set (or calibrate) the maximum steer or tilt positions rely on mechanical stoppers and pressure transducers. The calibration is often cumbersome for the user and does not allow to set steer or tilt limit positions intermediate to the maximum steer and tilt positions.

Therefore, there is a need for an alternative method to calibrate steer and/or tilt of a marine outboard engine. There is also a need for a method for setting limit positions of a plurality of marine outboard engines.

SUMMARY

It is an object of the present invention to ameliorate at least some of the inconveniences present in the prior art.

A method for limiting a steering motion of at least one outboard engine of a watercraft to desired port and starboard limit positions is provided. The at least one outboard engine moves about a steer axis. The watercraft has an electronic module (EM). The EM controls the steering motion of the at least one outboard engine. The method comprises initiating a calibration process of the at least one outboard engine for at least one of the desired port and starboard limit positions by inputting a sequence of at least one state of at least one switch. The at least one switch has at least two states. The at least one switch is operatively connected to the EM. The at least one switch is in the at least one state for at least one period of time. The method comprises moving the at least one outboard engine about the steer axis in a corresponding one of the port and starboard directions until the one of the desired port and starboard limit positions is reached; sensing an angular position of the at least one outboard engine about the steer axis by a sensor when the at least one outboard engine is at the one of the desired port and starboard limit positions; and recording the sensed position of the at least one outboard engine to be a corresponding one of the port and starboard limit positions of the at least one outboard engine about the steer axis in the one of the port and starboard directions.

In an additional aspect, the sensed position is recorded when the outboard engine has been stationary about the steer axis and the at least one switch has remained in a same state for a predetermined period of time.

In a further aspect, one of the at least two states of the at least one switch corresponds to the outboard engine being stationary about the steer axis in response to the at least one switch being in the one of the at least two states.

In an additional aspect, the at least one outboard engine is further movable about a tilt axis. The tilt axis is generally horizontal. The tilt axis is perpendicular to the steer axis. Outside of the steer calibration process, at least one state of the at least one switch controls a motion of the at least one outboard engine about the tilt axis.

In a further aspect, the at least one outboard engine is moved about the steer axis in response to the calibration process being initiated.

In an additional aspect, the method further comprises indicating that the one of the port and starboard limit positions of the at least one outboard engine has been recorded by the EM.

In a further aspect, the method further comprises indicating that the calibration process has been initiated before moving the at least one outboard engine.

In an additional aspect, the EM is an electronic management module (EMM). The EMM controls at least in part an engine of the at least one outboard engine.

In a further aspect, moving the at least one outboard engine about the steer axis in the one of the port and starboard directions includes one of: actuating the at least one switch to send a signal to an actuator of the at least one outboard engine to move the at least one outboard engine about the steer axis; manually moving the at least one outboard engine about the steer axis; and operating a steering wheel of the watercraft.

In an additional aspect, the at least one outboard engine includes at least port and starboard outboard engines. The port and starboard outboard engines move about corresponding port and starboard steer axes. The calibration process is a calibration process of one of the port and starboard outboard engines for a corresponding one of the desired port and starboard limit positions about a corresponding one of the port and starboard steer axes. The sequence is a first sequence. The period of time is a first period of time. The one of the port and starboard outboard engines is moved about the corresponding one of the port and starboard steer axes in a corresponding one of port and starboard directions until the one of the desired port and starboard limit positions is reached. The position of the one of the port and starboard outboard engines about the corresponding one of the port and starboard steer axes is sensed when the one of the port and starboard outboard engines is at the one of the desired port and starboard limit positions. The sensed position of the one of the port and starboard outboard engines is recorded to be a corresponding one of port and starboard limit positions of the one of the port and starboard outboard engines about the corresponding one of the port and starboard steer axes in the one of the port and starboard directions. The method further comprises moving the other one of the port and starboard outboard engines about the corresponding other one of the port and starboard steer axes in the corresponding other one of port and starboard directions until the other one of the desired port and starboard limit positions is reached; sensing an angular position of the other one of the port and starboard outboard engines about the corresponding other one of the port and starboard steer axes by a sensor when the other one of the port and starboard outboard engines is at the other one of the desired port and starboard limit positions; and recording the sensed position of the other one of the port and starboard outboard engines to be the corresponding other one of port and starboard limit positions of the other one of the port and starboard outboard engines about the corresponding one of the port and starboard steer axes in the other one of the port and starboard directions.

In a further aspect, the method further comprises determining the starboard limit position of the port outboard engine based on at least one of a distance between the port and starboard outboard engines, and the port limit position of the port outboard engine; and determining the port limit position of the starboard outboard engine based on at least one of the distance between the port and starboard outboard engines, and the starboard limit position of the starboard outboard engine. The method comprises assigning the starboard limit position of the port outboard engine to the port outboard engine and the port limit position of the starboard outboard engine to the starboard outboard engine.

In an additional aspect, at least one central outboard engine is disposed between the port and starboard outboard engines. Determining the starboard limit position of the port outboard engine and the port limit position of the starboard outboard engine further includes determining port and starboard limit positions of the at least one central outboard engine. Assigning the starboard limit position of the port outboard engine to the port outboard engine and the port limit position of the starboard outboard engine to the starboard outboard engine further includes assigning the port and starboard limit positions of the at least one central outboard engine to the at least one central outboard engine.

In a further aspect, the port limit position and the starboard limit position of the at least one central outboard engine are the smallest of a limit position of the at least one central outboard engine determined based on the distance between the port and starboard outboard engines, the port limit position of the port outboard engine and the starboard limit position of the starboard outboard engine.

In an additional aspect, the EM includes a first electronic module connected to the port outboard engine, a second electronic module connected to the starboard outboard engine, and a third electronic module connected to the at least one central outboard engine. The first, second, and third electronic modules are connected to each other in a network. The port and starboard limit positions of the at least one central outboard engine are assigned via the network.

A method for limiting a tilting motion of an outboard engine of a watercraft to at least one desired limit position is also provided. The outboard engine moves about a generally horizontal tilt axis. The watercraft has an electronic module (EM) controlling the tilting motion of the outboard engine. The method comprises initiating a calibration process for the at least one desired limit position by inputting a sequence of at least one state of at least one switch. The at least one switch is operatively connected to the EM. The at least one switch has at least two states. The at least one switch is in the at least one state for at least one period of time. The method comprises moving the outboard engine about the tilt axis in one direction until the at least one desired limit position is reached; sensing an angular position of the outboard engine about the tilt axis by a sensor when the outboard engine is at the at least one desired limit position; and recording the sensed position of the outboard engine to be a limit position of the outboard engine about the tilt axis in the one direction.

In an additional aspect, the sensed position is recorded when the outboard engine has been stationary about the tilt axis and the at least one switch has remained in a same state for a predetermined period of time.

In a further aspect, the outboard engine is moved about the tilt axis by actuating the at least one switch to send a signal to an actuator to move the outboard engine about the tilt axis.

In an additional aspect, the EM is an electronic management module (EMM). The EMM controls at least in part an engine of the outboard engine.

In a further aspect, the outboard engine is moved about the tilt axis in response to the calibration process being initiated.

In an additional aspect, the method further comprises indicating that the limit position of the outboard engine has been recorded by the EM.

In a further aspect, the method further comprises indicating that the calibration process has been initiated.

In a further aspect, one of the at least two states of the at least one switch corresponds to the outboard engine being stationary about the tilt axis in response to the at least one switch being in the one of the at least two states.

A watercraft is also provided. The watercraft has a hull and at least one outboard engine movably connected to the hull. The at least one outboard engine is moveable about at least one axis. An electronic module (EM) is operatively connected to the at least one outboard engine. The EM is adapted to control a motion of the at least one outboard engine about the at least one axis. A sensor is connected to the at least one outboard engine. The sensor senses an angular position of the at least one outboard engine about the at least one axis. At least one switch is operatively connected to the EM. The at least one switch has a first state and a second state. When the at least one switch is in the second state, the at least one outboard engine is moving in one direction about the at least one axis. When the at least one switch is in the first state, the at least one outboard engine is stationary in the one direction about the at least one axis. When the at least one switch is positioned following a sequence of states, a calibration process about the at least one axis in the one direction is initiated.

Using the above methods and system, the user can simply and quickly calibrate one or more limit positions of one or more outboard engines without the use of tools or external electronic devices (e.g. personal tablet or computer).

For purposes of this application, the terms related to spatial orientation such as upward, downward, port, starboard, vertical, and horizontal are as they would normally be understood by a driver of the watercraft sitting thereon in a normal driving position.

Embodiments of the present invention each have at least one of the above-mentioned aspects, but do not necessarily have all of them. It should be understood that some aspects of the present invention that have resulted from attempting to attain the above-mentioned object may not satisfy this object and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION

Figure 1:
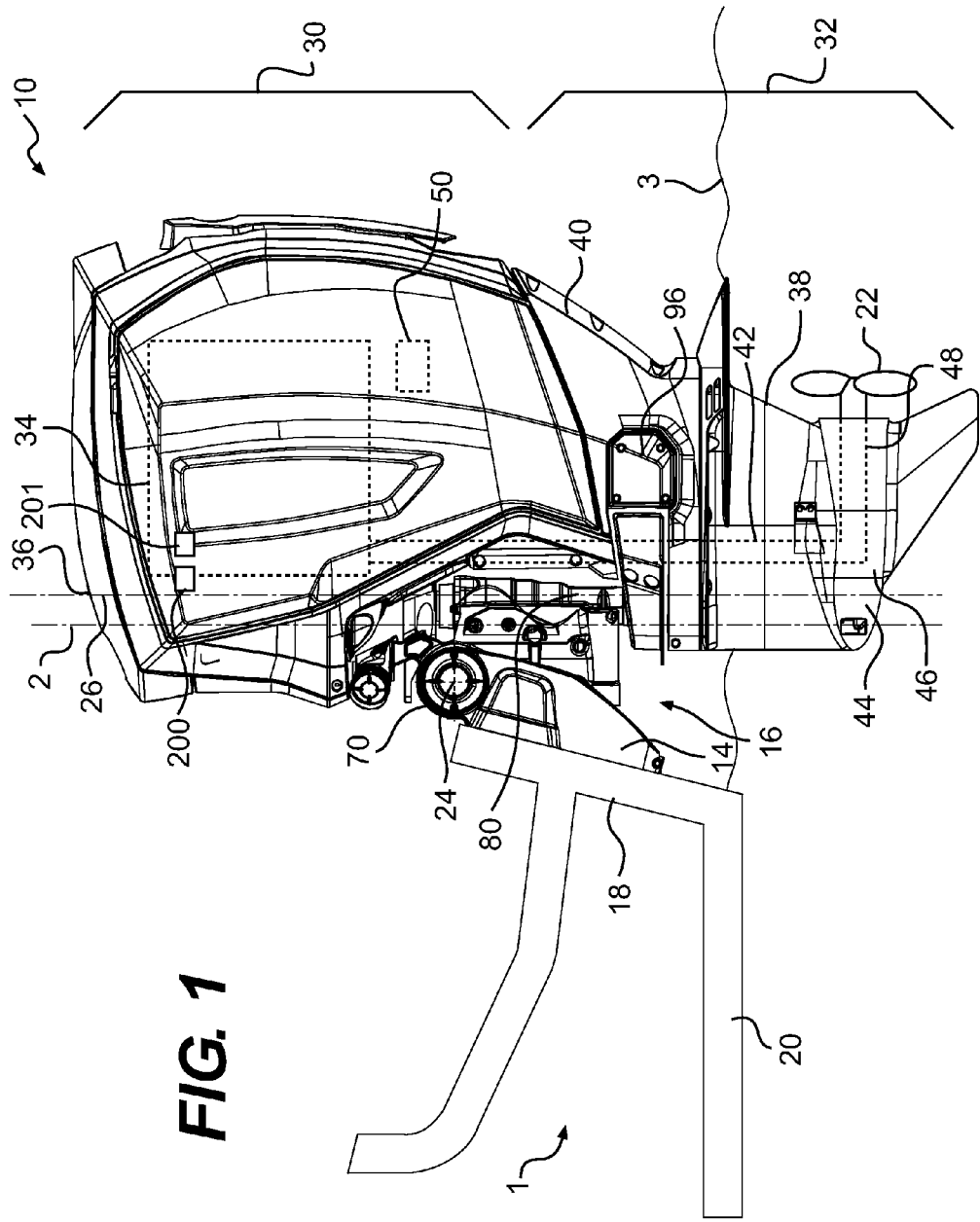
FIG. 1 is a left side elevation view of an outboard engine on a watercraft and in an upright position.
Figure 2:
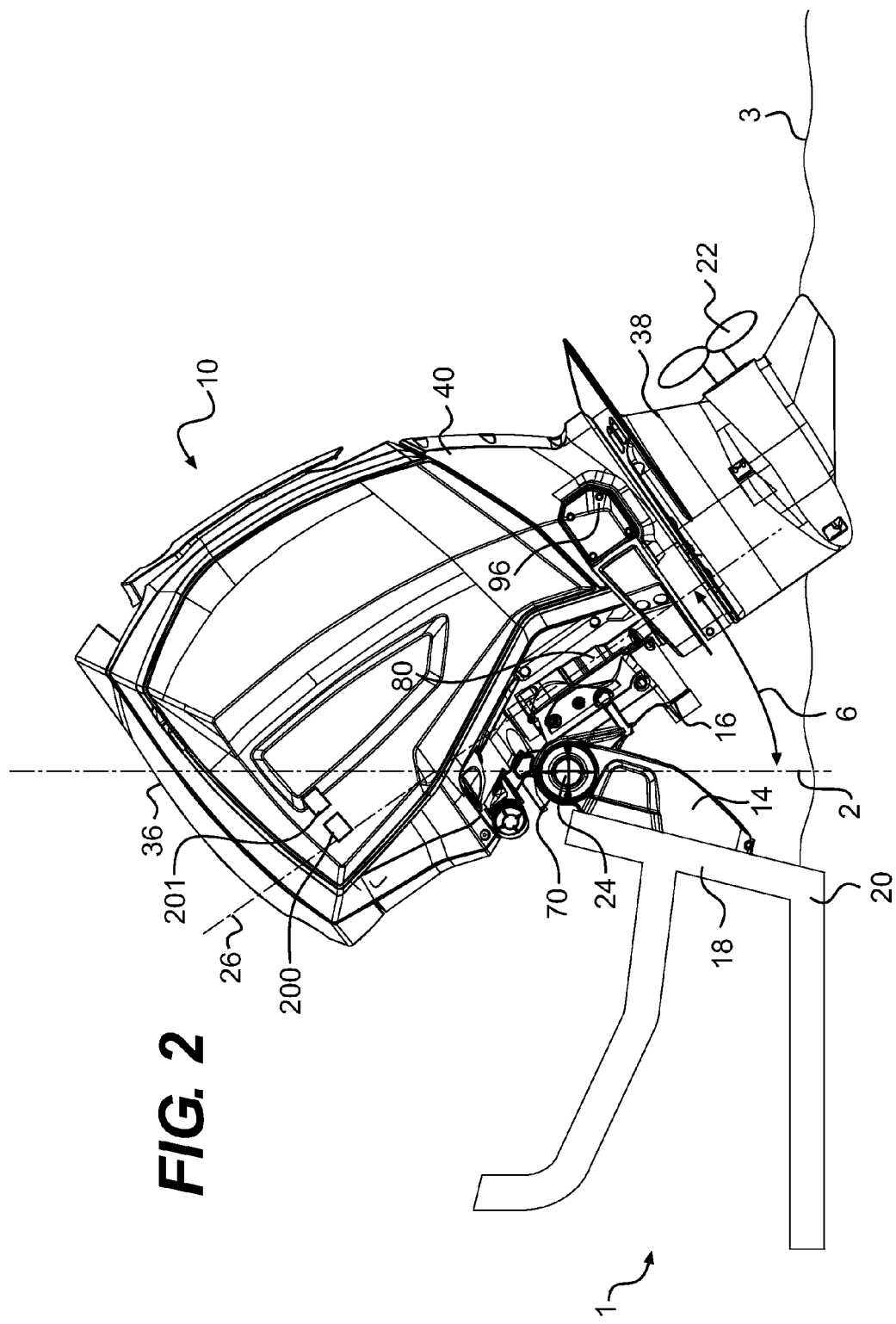
FIG. 2 is the outboard engine of FIG. 1 positioned at an angle from vertical.
Figure 3:
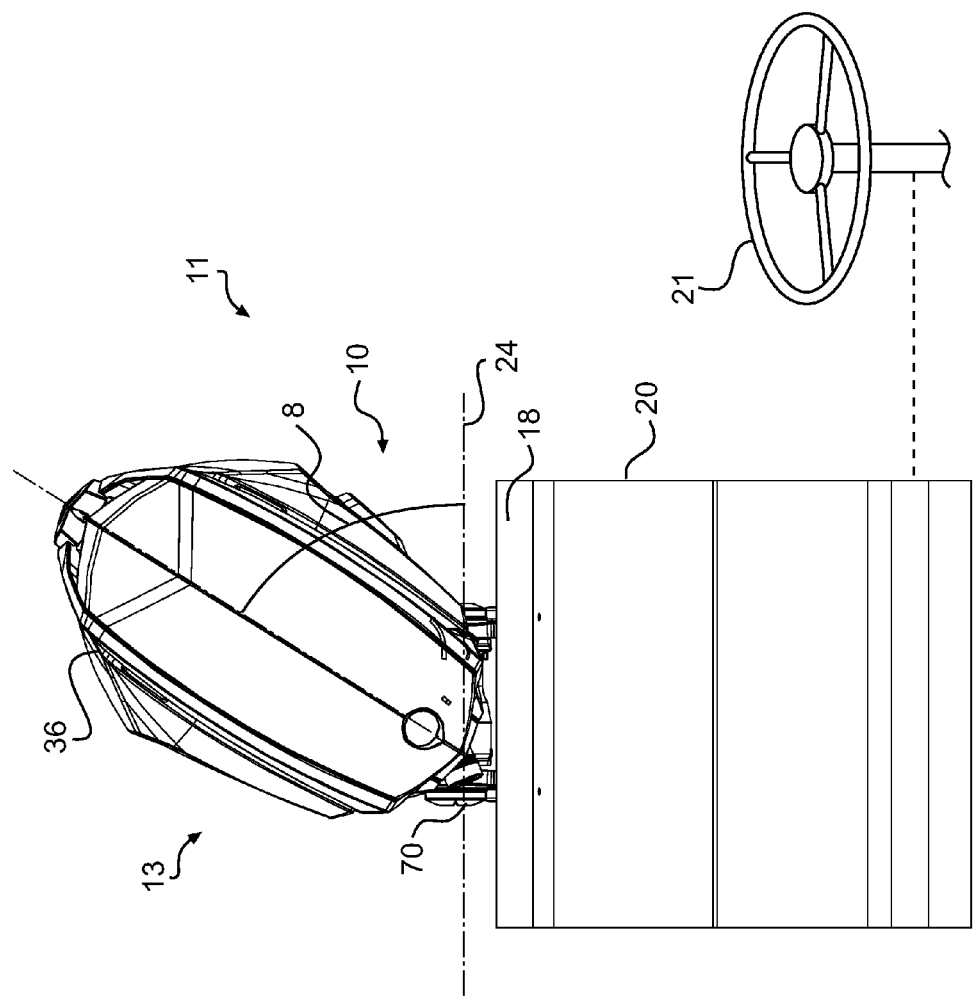
FIG. 3 is top plan view of the outboard engine of FIG. 1 steered port.

With reference to FIGS. 1 to 3, a watercraft 1 (shown partially) has a marine outboard engine 10 mounted to a transom 18 of a hull 20 of the watercraft 1. The watercraft 1 has a port side 11 and a starboard side 13 (both shown in FIG. 3). The outboard engine 10 is mounted to the watercraft 1 via a stern bracket 14 and an integrated tilt/trim/steering subsystem 16. The stern bracket 14 and the integrated tilt/trim/steering subsystem 16 support the outboard engine 10. The outboard engine 10 has a port side 11 and a starboard side 13 (both shown in FIG. 3). The integrated tilt/trim/steering subsystem 16 uses hydraulic rotary actuators 70 and 80 to tilt, trim and steer the outboard engine 10. The outboard engine 10 can be tilted up or down relative to the hull 20 by the integrated tilt/trim/steering subsystem 16 about a tilt axis 24 extending generally horizontally. The tilt/trim/steering subsystem 16 can be steered about a steer axis 26 extending generally perpendicularly to the tilt axis 24. It is contemplated that tilt, trim and steering could be achieved using other types of systems/subsystems. For example, the actuators 70 and 80 could be replaced by linear hydraulic actuators. The stern bracket 14 and the tilt/trim/steering subsystem 16 will be described in greater detail below. The watercraft 1 includes other elements, which will not be described in details herein.

The outboard engine 10 includes an upper portion 30 and a lower portion 32. The upper portion 30 includes an engine 34 surrounded and protected by a cowling 36. The engine 34 housed within the cowling 36 is an internal combustion engine. The lower portion 32 includes the gear case assembly 38, which includes a propeller 22, and a skeg portion 40, which extends from the upper portion 30 to the gear case assembly 38. The engine 34 is coupled to a driveshaft 42. When the outboard engine 10 is in the upright position as shown in FIG. 1, the driveshaft 42 is oriented vertically. It is contemplated that the driveshaft 42 could be oriented differently relative to the engine 34. The driveshaft 42 is coupled to a drive mechanism 44, which includes a transmission 46 and the propeller 22 mounted on a propeller shaft 48. The propeller shaft 48 is shown in the Figures to be perpendicular to the driveshaft 42, however it is contemplated that it could be at other angles. The driveshaft 42 as well as the drive mechanism 44 are housed within the gear case assembly 38, and transfer the power of the engine 34 to the propeller 22 mounted on the rear side of the gear case assembly 38 of the outboard engine 10.

An engine management module (EMM) 50 disposed inside the cowling 36 controls the engine 34. The EMM 50, or at least a portion of the EMM 50, is an electronic module (EM). The EMM 50 receives data signals from various components of the engine 34, such as combustion related parameters (spark timing, spark duration, fuel injection timing and quantity, exhaust valve position) to control the engine 34. These components include, for example, a throttle operator position sensor, a transmission operator position sensor, or a speed sensor. The EMM 50 also receives data signals from a steering position sensor 57 (shown in FIG. 5) and a tilt position sensor 55 (shown in FIG. 4) and uses these data signals to control the integrated tilt/trim/steering subsystem 16, and more specifically the hydraulic rotary actuators 70, 80. The steering position sensor 57 and the tilt position sensor 55 are both angular sensors. The steering position sensor 57 and the tilt position sensor 55 are disposed on the tilt/trim/steering subsystem 16. It is contemplated that the steering position sensor 57 and the tilt position sensor 55 could be disposed somewhere else on the watercraft 1. It is contemplated that the steering position sensor 57 and the tilt position sensor 55 could not be angular sensors, yet would sense angular positions of the outboard engine 10.

Other known components of an engine assembly are included within the cowling 36, such as a starter motor, an alternator and the exhaust system, and will not be described herein again.

The tilt axis 24 extends through the tilt/trim hydraulic rotary actuator 70 laterally of the watercraft 1. As shown in FIG. 1, when the outboard engine 10 is in a fully tilted down position, the propeller 22 is completely submerged under the surface of a body of water 3, and the outboard engine 10 is at a tilt angle 6 of 0 degrees with respect to the vertical 2. As shown in FIG. 2, when the outboard engine 10 is in a fully tilted up position, the propeller 22 is completely outside the body of water 3, and the outboard engine 10 is at the tilt angle 6 of 67 degrees with respect to the vertical 2. It is contemplated that the tilt limit position could be at the tilt angle 6 more or less than 67 degrees. The outboard engine 10 can be positioned in positions intermediate the positions shown in FIGS. 1 and 2 with the propeller 22 either fully submerged or partially submerged in the body of water. A method for limiting the motion of the outboard engine 10 about the tilt axis 24 will be described below.

A pair of switches 200, 201 disposed on the cowling 36 is used to actuate the rotation of the outboard engine 10 about the tilt axis 24. Another pair of switches (not shown) disposed on the steering assembly by a throttle lever (not shown) also actuate the rotation of the outboard engine 10 about the tilt axis 24. The switches 200, 201 are push buttons. The switches 200, 201 are connected to the engine management module (EMM) 50 for operating the rotation of the outboard engine 10. As will be described below, the switches 200, 201 are also used to initiate calibrations of limit positions of the outboard engine 10. It is contemplated that the switches 200, 201 could be located somewhere else on the watercraft 1. It is contemplated that the watercraft 1 could have only one or more than two switches 200, 201. It is contemplated that the switches 200, 201 could be rocking switches or dials. It is also contemplated that the two switches 200, 201 could be icons on a touch screen of a display of the watercraft 1. For purposes of the present application, the icons on the display are considered switches. It is further contemplated that the switches 200, 201 could be any user input means on a user interface, for example, a keyboard or mouse on a laptop. It is also contemplated that the switches 200, 201 could be linked to the calibration only, or that only one of the switches 200, 201 could be used for the calibration and the other one for the tilting of the outboard engine 10. It is also contemplated that the switches 200, 201 could be used for moving the outboard engine 10 about the steer axis 26. It is also contemplated that the switches 200, 201 could be connected an electronic module (EM) separate from the EMM 50. The EM could control simple tasks such as controlling the tilt of the outboard engine 10 only, or the steer of the outboard engine 10 only. An operation of the switches will be described below.

As best seen in FIG. 2, the steer axis 26 extends longitudinally through the steering hydraulic rotary actuator 80. FIG. 3 shows a port limit position of the outboard engine 10 (a starboard limit position being a mirror image of the port limit position) with the outboard engine 10 at a steer angle 8 of 64 degrees with respect to the tilt axis 24. It is contemplated that the port limit position could be at the steer angle 8 more or less than 64 degrees. The outboard engine 10 can be positioned in positions intermediate the port and starboard limit positions so as to steer adjust a degree of steering of the watercraft 1. By rotating a steering wheel 21 of the watercraft 1, the user rotates the outboard engine 10 about the steer axis 26 between the port and starboard limit positions. When the outboard engine 10 is at the steer angle 8 of 90 degrees, the watercraft 1 operates in a straight line. A method 500 for setting or calibrating the limits of the motion of the outboard engine 10 about the steer axis 26 will be described below. It is contemplated that the starboard limit position could be different from the port limit position. It is also contemplated that the port and starboard limit positions could be different from the ones shown in the Figures.

Figure 4:
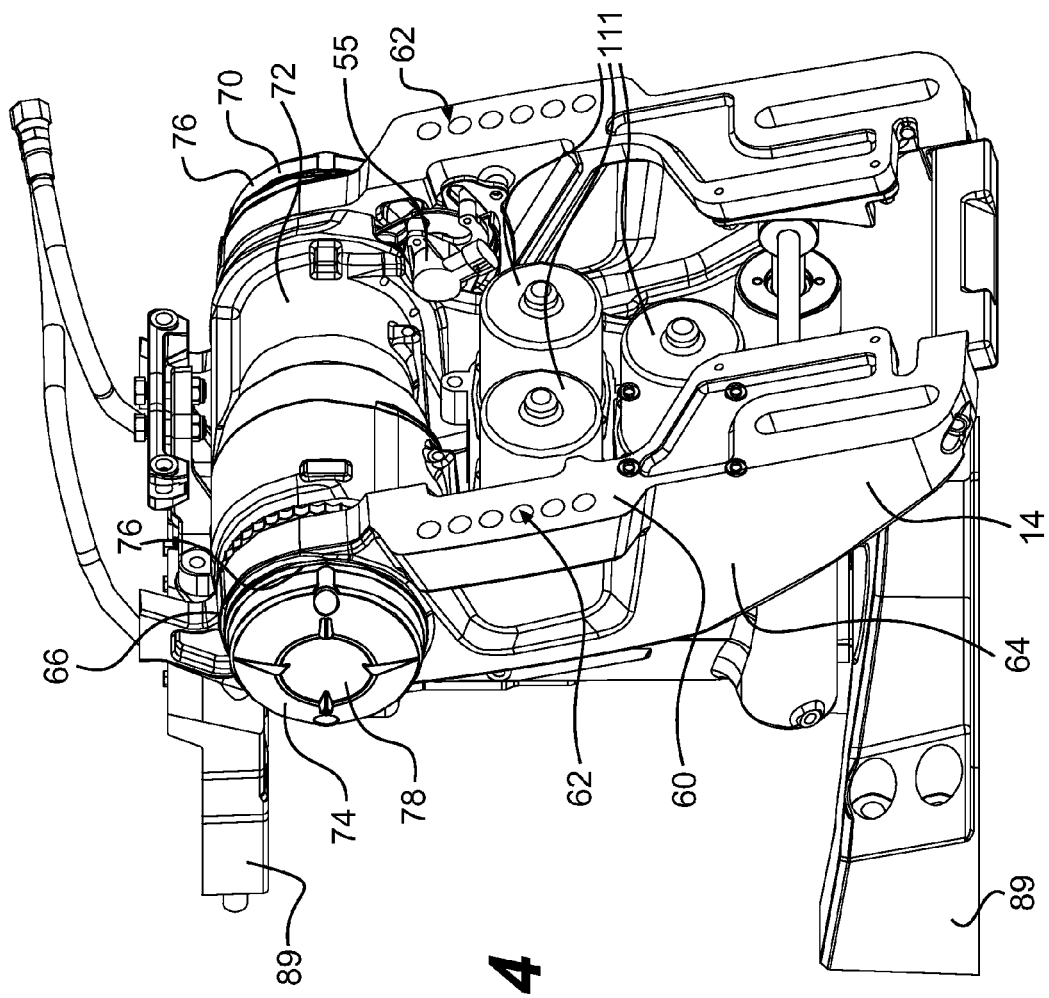
FIG. 4 is a perspective view taken from a front, right side of a bracket for the outboard engine of FIG. 1 shown in a fully tilted down position.
Figure 5:
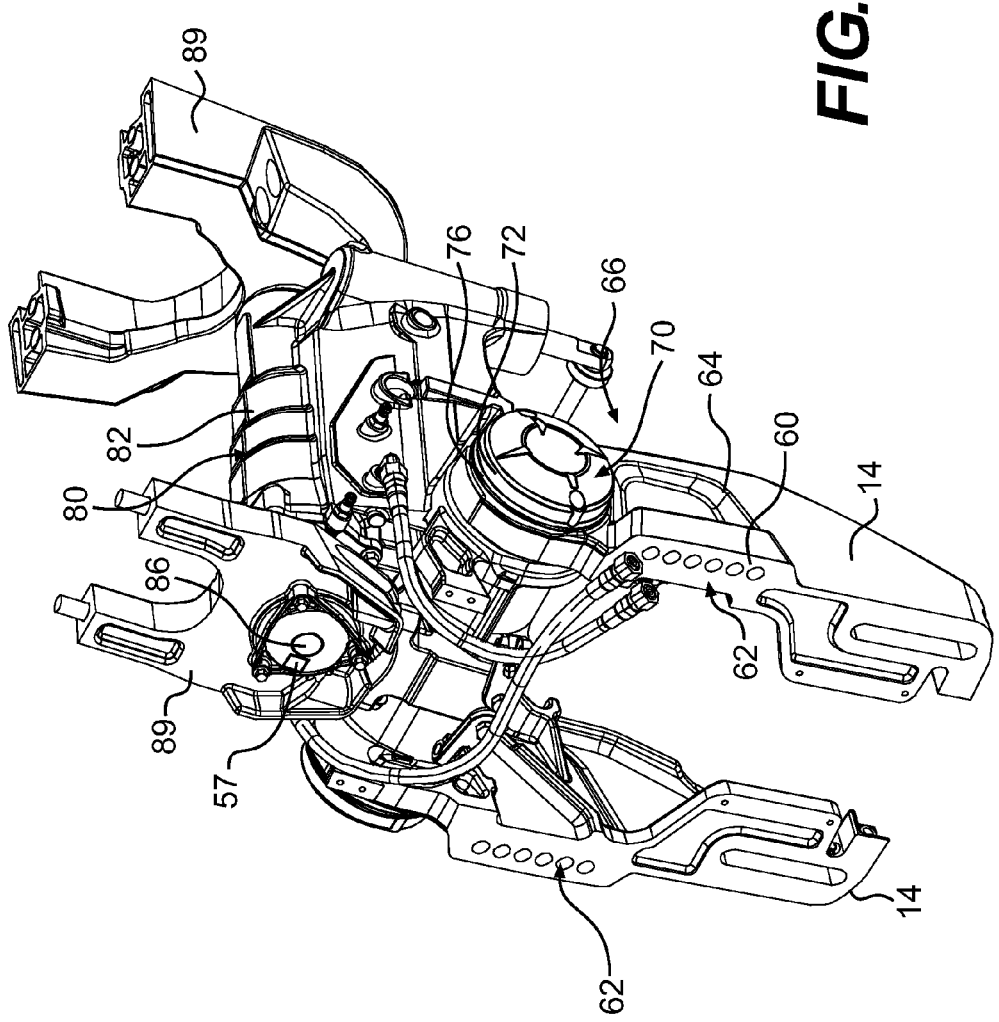
FIG. 5 is a perspective view taken from a top, left side of the bracket of FIG. 4 shown in a fully tilted up position.
Figure 6A:
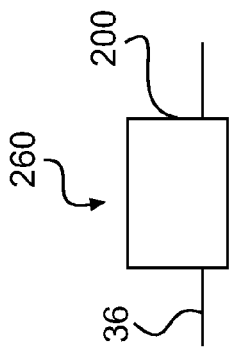
FIG. 6A illustrates a switch for the outboard engine of FIG. 1 shown in a lowered position.
Figure 6B:
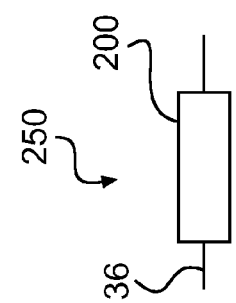
FIG. 6B illustrates the switch of FIG. 6A shown in a raised position.
Figure 7A:
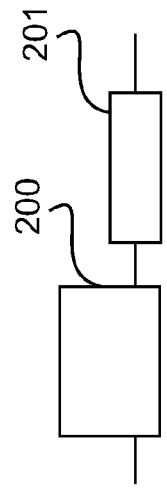
FIGS. 7A to 7D illustrate various positions of two switches for the outboard engine of FIG. 1.
Figure 7B:
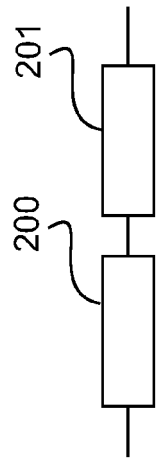
Figure 7C:
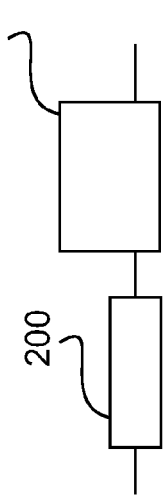
Figure 7D:
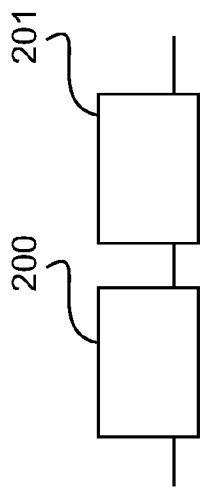

Referring now to FIGS. 4 and 5, the stern bracket 14 and the tilt/trim/steering subsystem 16 will now be described in greater detail.

The stern bracket 14 includes an anchoring plate 60 having a series of apertures 62 on each side adapted for fastening the anchoring plate 60 to the transom 18 of the watercraft 1. A pair of supporting flanges 64 extend on each side of the stern bracket 14. Each supporting flange 64 includes a receptacle portion 66 configured to secure and fix the tilt/trim/steering subsystem 16 to the stern bracket 14. The tilt/trim hydraulic rotary actuator 70 includes a main cylindrical body 72 and two anchoring end portions 74. Each anchoring end portion 74 includes a recess 76 adapted for insertion into the receptacle portions 66 of the supporting flanges 64 for connection to the stern bracket 14. Each anchoring end portion 74 is fixed to the supporting flanges 64 and is non-rotatable relative to the supporting flanges 64 and to the stern bracket 14. The anchoring end portions 74 are connected together via an internal shaft 78 extending the length of the hydraulic rotary actuator 70. The main body 72 of the tilt/trim hydraulic rotary actuator 70 is rotatable relative to the anchoring end portions 74 and therefore rotatable relative to the supporting flanges 64 and to the stern bracket 14. Hydraulic fluid is routed into the rotary actuator 70 through a pair of hydraulic apertures (not shown).

The tilt/trim/steering subsystem 16 includes the steering hydraulic rotary actuator 80 and hydraulic units 111. The rotary actuator 80 includes a main cylindrical body 82 and two end plates. A central shaft 86 extend through the main body 82 and extends outside the main body 82 from both ends of the cylindrical body 82. The central shaft 86 is rotatable relative to the main body 82. A pair of brackets 89 is non-rotatably connected to ends of the central shaft 86. The brackets 89 are adapted for connection to the outboard engine 10 and to a pair of recessed portions 96 located on each side of the skeg portion 40. The outboard engine 10 is therefore secured to the steering hydraulic rotary actuator 80 also at two points thereby avoiding undue distortion. When the central shaft 86 is rotated relative to the main cylindrical body 82, the outboard engine 10 rotates with the central shaft 86. Hydraulic fluid is routed into the rotary actuator 80 through hydraulic apertures (not shown).

Hydraulic passages 100 (not shown) are connected to the apertures of the steering hydraulic rotary actuator 80 and to the apertures of the tilt/trim hydraulic rotary actuator 70. The hydraulic passages are integrally formed in the tilt/trim/steering subsystem 16 and are connected to the hydraulic units 111. The hydraulic units 111 each include a flow control valve system (not shown) which is itself connected to a hydraulic pump (not shown) powered by an electric motor (not shown). The hydraulic units 111 are mounted to the tilt/trim/steering subsystem 16. It is contemplated that the hydraulic units 111 could be mounted to the stern bracket 14 or the transom 18 of the watercraft 1. The EMM 50 is electrically connected to the electric motor to monitor the amount of electrical current used by the electric motor. It is contemplated that a switch could instead control the electric motor.

Referring more specifically to FIG. 5, the main cylindrical body 82 of the steering hydraulic rotary actuator 80 and the main cylindrical body 72 of the tilt/trim hydraulic rotary actuator 70 are cast in one piece for optimum rigidity and precision of the perpendicularity of the rotary actuators 70 and 80. The tilt/trim hydraulic rotary actuator 70 and steering hydraulic rotary actuator 80 are therefore integrated into a single unit for increased precise steering and precise trimming of the outboard engine 10. The rotary actuators 70 and 80 could also be rigidly connected together through mechanical means or welding or both so as to be integrated as a single unit.

Turning now to FIGS. 6A to 7D, the two switches 200, 201 have two positions (or states). They are movable between a lowered position 250 (FIG. 6A) and a raised position 260 (FIG. 6B). The two switches 200, 201 are biased toward the raised position 260. Every combined position of the two switches 200, 201 forms a combination. Successive combinations for successive periods of time form a sequence of positions. A sequence is for example the switch 200 being in the lowered position 250 and the switch 201 being in the raised position 260 for 1 second followed by the switches 200, 201 being both in the lowered position 250 for 3 seconds.

For two switches having two positions each, there are 4 possible combinations. The possible combinations for the two switches 200, 201 are shown in FIGS. 7A to 7D. It is possible that the switches 200, 201 could have more than two positions. It is also contemplated that the two switches 200, 201 could not be biased toward the raised position 260. It is also contemplated that the two switches 200, 201 could be on a remote key or on a remote screen.

When the switch 200 is held in the lowered position 250 and the switch 201 is in the raised position (FIG. 7A), a first combination of positions (or states) is formed and this first combination has for effect to move the outboard engine 10 upward about the tilt axis 24 as long as the switch 200 is held in the lowered position 250. When the switch 201 is held in the lowered position 250 and the switch 201 is in the raised position 260 (FIG. 7B), a second combination is formed and this second combination has for effect to move the outboard engine 10 downward about the tilt axis 24 as long as the switch 201 is held in the lowered position 250. When the switches 200, 201 are simultaneously in the raised position 260 (FIG. 7C), a third combination is formed, in which the outboard engine 10 is stationary about the tilt axis 24. When the switches 200, 201 are simultaneously in the lowered position 250 (FIG. 7D) a fourth combination is formed. When the fourth combination is held for at least 3 seconds, this instructs the EMM 50 to start a tilt calibration. When the switches 200, 201 are simultaneously in the lowered position 250 for a sequence of two fourth combinations of less than 1 second each, this instructs the EMM 50 to start a steer calibration. The EMM 50 can be programmed to recognize a great number of sequences and to attribute a task to each of these sequences. The tilt and steer calibration will be described below.

Figure 8:
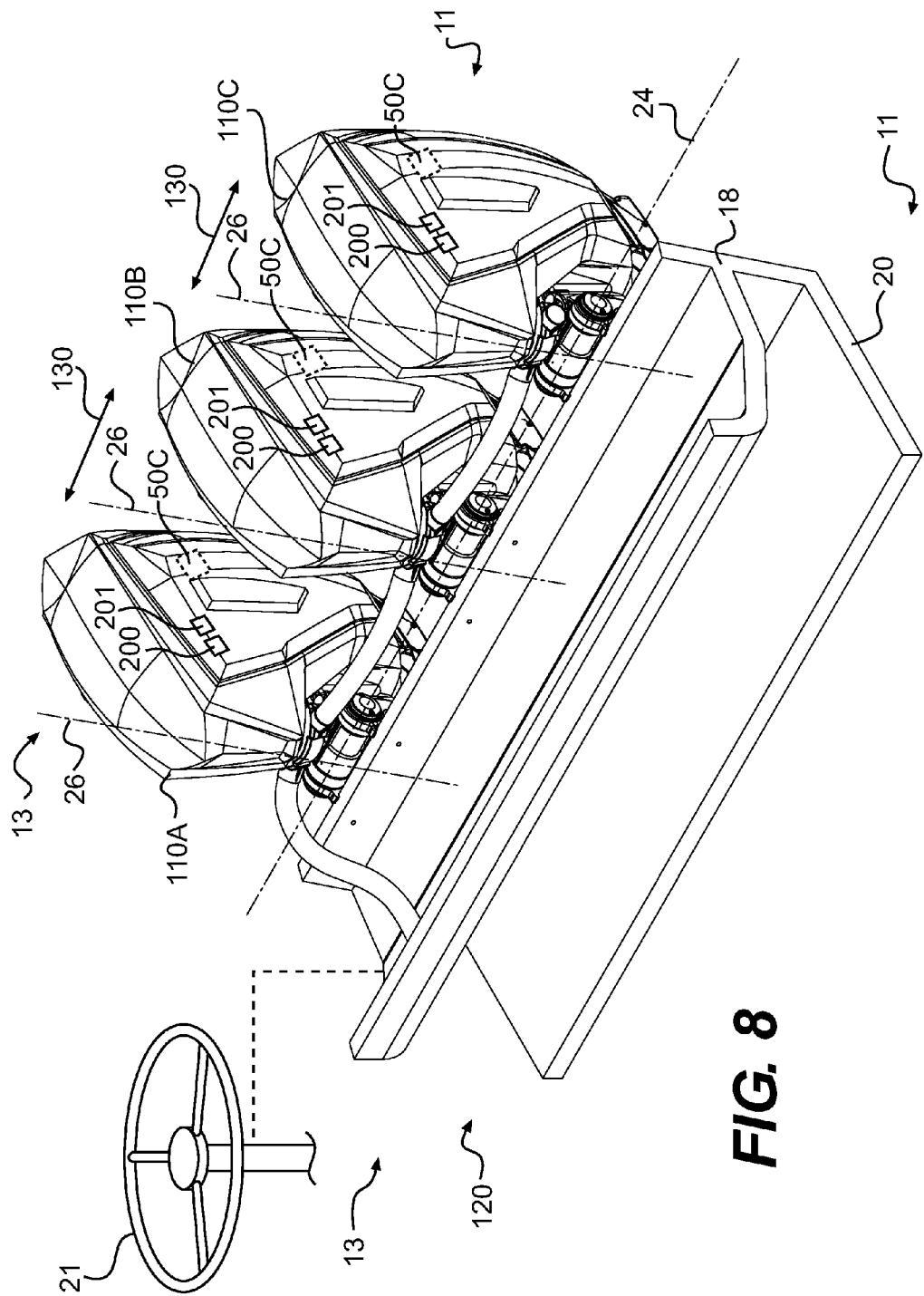
FIG. 8 is a perspective view of a plurality of outboard engines on a watercraft.

Turning now to FIG. 8 a watercraft 120 has three outboard engines 110A, 110B, 110C disposed laterally adjacent to each other, with the outboard engine 110B disposed between the outboard engines 110A, 110C. The outboard engine 110A is a starboard outboard engine, the outboard engine 110C is a port outboard engine, and the outboard engine 110B is a central outboard engine. Each of the outboard engines 110A, 110B, 110C is similar to the outboard engine 10, and will not be described in greater detail herein again. Each outboard engine 110A, 110B, 110C has an associated EMM 50A, 50B, 50C. The EMMs 50A, 50B, 50C are connected in a telecommunication network and communicate with each other. Each of the EMM 50A, 50B, 50C are similar to the EMM 50, and will not be described in greater detail herein again. It is contemplated that the EMMs 50A, 50B, 50C could not communicate with each other. It is also contemplated that the EMMs 50A, 50B, 50C could be a single EMM. The watercraft 120 being similar to the watercraft 1, it will not be described herein again, and elements common to the watercraft 1 will be referred to using same reference numerals. A method 600 for calibrating a steering motion of the outboard engines 110A, 110B, 110C will be described below.

Figure 9:
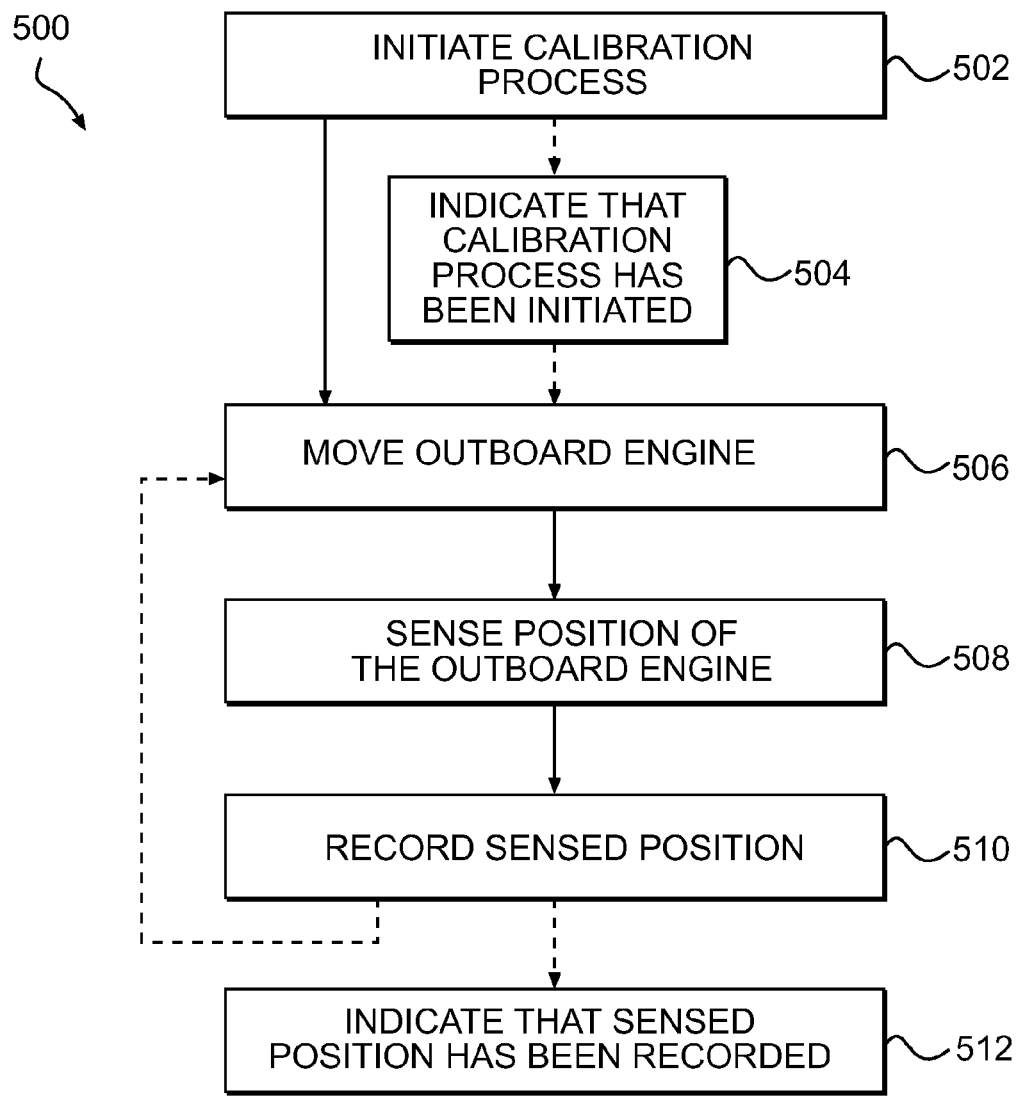
FIG. 9 is a flow chart of a method for limiting a position of the outboard engine of FIG. 1.

Turning now to FIG. 9, a method 500 for limiting a motion of the outboard engine 10 about the tilt axis 24 will be described. The method for limiting the motion of the outboard engine 10 about the steer axis 26 is similar to the method 500 for limiting the motion of the outboard engine 10 about the tilt axis 24, and will not be described herein again except for some specific aspects.

The outboard engine 10 being positioned at the steer angle 8 of 90 degrees, the method 500 starts at step 502 with initiating a tilt calibration process. If the outboard engine 10 is not positioned at the steer angle 8 of 90 degrees, the user may move the outboard engine 10 so that it is at the steer angle 8 of 90 degrees. The user may start the tilt calibration at any tilt angle 6. Similarly, when initiating the steer calibration, the user starts the steer calibration when the outboard engine 10 is at the tilt angle 6 at 0 degrees (fully tilted down position), and the user may start the steer calibration with the outboard engine 10 at any steer angle 8. It is contemplated that the outboard engine 10 could be at the steer angle 8 other than 90 degrees when initiating the tilt calibration and at the tilt angle 6 other than 0 degrees when initiating the steer calibration. It is also contemplated that the outboard engine 10 may be at a specific tilt angle 6 before starting the tilt calibration.

To initiate calibration, the user positions the switches 200, 201 simultaneously in the lowered position 250 for 3 seconds. The switches 200, 201 are operatively connected to the EMM 50, so that the positioning of the switches 200, 201 in the lowered position 250 for 3 seconds corresponds to instructions of initiating the calibration process. Because the EMM 50 is instructed that calibration has been initiated, the EMM 50 will analyze the sequences of the switches 200, 201 performed after step 502 differently than if they were performed outside the calibration process. Indeed, some of the sequences of the switches 200, 201 may not have the same meaning for the EMM 50 during the calibration compared to if they were performed outside the calibration process. For example, when the steer calibration process is initiated, the outboard engine 10 may be moved to the port 11 and starboard sides 13 using the same sequences of the switches 200, 201 used to tilt the outboard engine 10 up and down outside the steer calibration process. It is contemplated that the tilt calibration could be initiated by positioning the switches 200, 201 simultaneously in the lowered position 250 for more or less than 3 seconds. It is contemplated that the tilt calibration could be initiated by positioning only one of the switches 200, 201 in the lowered position 250, or by positioning the switches 200, 201 in consecutive combinations of raised and lowered positions 260, 250. It is also contemplated that the tilt calibration could be initiated by actuating a switch other than the switches 200, 201. As will be described below for the method 600, the steer calibration is initiated by positioning the switches 200, 201 simultaneously in the lowered position 250 for two consecutive periods of less than 1 second. It is contemplated that the tilt calibration and the steer calibration could be initiated using a same sequence of positions of the switches 200, 201. It is contemplated that the functions of the switches 200, 201 could be analyzed by the EMM 50 to be the same during and outside the calibration process.

In an optional step 504, the user is alerted that the tilt calibration is initiated. The EMM 50 controls the outboard engine 10 to vibrate by actuating the hydraulic actuator 80 for a fraction of second. This brief actuation causes the outboard engine 10 to move slightly (vibrate) and to emit a sound that alerts the user. It is contemplated that the outboard engine 10 could indicate physically that the tilt calibration is initiated by ways other than vibrating the outboard engine 10. For example, a LED on the outboard engine 10 could be flashing and/or a sound could be emitted. In another example, a fuel pump could be momentarily energized to make a noise to alert the user.

At step 506, the user moves the outboard engine 10 about the tilt axis 24 upwardly until reaching a desired tilt limit position. To move the outboard engine 10, the user moves the switch 200 in the lowered position 250. The user releases the switch 200 to move back to the raised position 260 when he/she wants to stop the motion of the outboard engine 10. This is the case, for example, when it reaches the desired tilt limit position. It is contemplated that the user could actuate the switch 201 or a combination of the switches 200, 201 to move the outboard engine 10 upwardly. It is contemplated that the user could move the outboard engine 10 without using the switches 200, 201. For example, the user could move the outboard engine 10 manually. It is also contemplated that the outboard engine 10 could move automatically from the initiation of the calibration at step 502. The user would then interrupt the motion of the outboard engine 10 at the desired tilt limit position by positioning one or both of the switches 200, 201 following a specific sequence to indicate the EMM 50 to stop moving the outboard engine 10. In the case of the steer calibration, the user could also move the outboard engine 10 about the steer axis 26 by moving the steering wheel 21.

At step 508, a position of the outboard engine 10 is sensed by the tilt position sensor 55. It is contemplated that the position of the outboard engine 10 could have been sensed at regular intervals or continuously while the outboard engine 10 was being moved. It is also contemplated that the position of the outboard engine 10 when at the desired tilt limit position could be sensed only after a predetermined period of time has elapsed with the outboard engine 10 being stationary. It is also contemplated that the user could have to move one or both of the switches 200, 201 to the lowered position 250 to indicate to the tilt position sensor 55 via the EMM 50 to sense the position of the outboard engine 10.

At step 510, the sensed position of step 508 is recorded by the EMM 50 to be the tilt limit position when a predetermined period of time has elapsed with the outboard engine 10 stationary and the switches 200, 201 in the raised position 260. It is contemplated that the user could have to press on one or both of the switches 200, 201 to indicate to the EMM 50 to record the position of the outboard engine 10. When the tilt limit position is recorded, the EMM 50 prevents the outboard engine 10 to move upwardly past the tilt limit position.

From step 510, the method 500 can go back to step 506 for calibrating a downward limit tilt position. Usually the downward tilt position is not calibrated because is it the position at which the outboard engine 10 abuts the transom 18. However, the user may want to calibrate a downward limit tilt position, and the method 500 allows him to do so. Calibrating two limit positions back to back can also be applied to the steer calibration for the port and starboard limit positions. For example, when one of the port and starboard limit positions is recorded by the EMM 50, the user may not have to initiate the steer calibration again, but could just move the outboard engine 10 in the opposite direction to calibrate the other one of port and starboard limit positions.

In an optional step 512, from step 510, the EMM 50 controls the outboard engine 10 to vibrate in order to alert the user that the tilt limit position has been recorded. It is contemplated that the outboard engine 10 could indicate physically that the tilt limit position has been recorded by ways other than vibrating the outboard engine 10. For example, a LED on the outboard engine 10 could be flashing and/or a sound could be emitted.

Once the tilt limit position (or both tilt limit positions depending of the calibration performed) is recorded, the EMM 50 resumes to an operation mode outside the calibration process.

The calibration method 500 could be performed automatically by the EMM 50 without any user intervention. It is also contemplated that the calibration method 500 could involve some steps requiring user input or user control. The user could communicate with the EMM 50, for example, by means of a laptop, tablet, desktop, smart phone or other such user interface device. After the sensing step 508, in which the angular position of the outboard engine 10 is sensed by the tilt position sensor 55, the angular position of the outboard engine 10 could be displayed on a screen of the laptop, tablet, desktop, smart phone or other user interface in a display step. The user could then manually input, using the user interface, the sensed angular position for recording by the EMM 50. Similarly, the steer calibration method could also involve some steps incorporating user input or user control via a laptop, tablet, desktop, smart phone or other user interface by which the user communicates with the EMM 50.

The method 500 also applies to the watercraft 120 for each of the outboard engines 110A, 110B, 110C moving about their tilt axes 24. The user could calibrate the outboard engines 110A, 110B, 110C as described in the method 500 one by one, or could calibrate one of the outboard engines 110A, 110B, 110C as described in the method 500 and input the calibrated limit position to the other outboard engines 110A, 110B, 110C via an external device such as a laptop or a tablet or via a user interface on the watercraft 1 connected to the EMMs 50A, 50B, 50C or via a network connecting the EMMs 50A, 50B, 50C.

Figure 10:
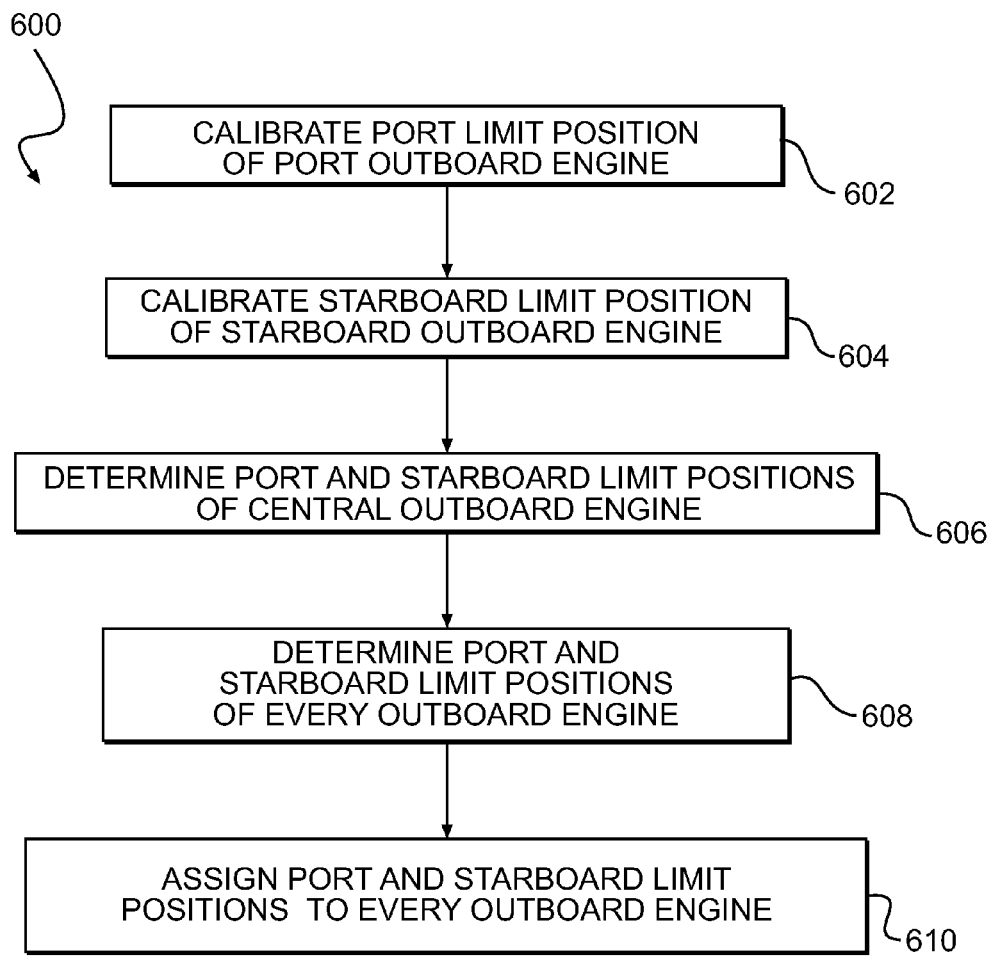
FIG. 10 is a flow chart of a method for limiting a position of the plurality of outboard engines of FIG. 8.

Turning now to FIG. 10, the method 600 for limiting a motion of the plurality of outboard engines 110A, 110B, 110C of the watercraft 120 about their corresponding steer axes 26 will be described.

The method 600 starts at step 602 by calibrating the port steering limit of the port outboard engine 110C. To calibrate the port steering limit, the step 602 performs the steps of the method 500 described above applied to the steer calibration of in the port direction and using the steering position sensor 57. It is contemplated that the steps 504 and/or 512 of the method 500 could be omitted from the step 602.

At step 604, the starboard steer limit position of the starboard outboard engine 110A is calibrated similarly to what at been done at step 602 for the port outboard engine 110C. It is contemplated that step 604 could be performed before step 602.

At step 606, the port and starboard limit positions of the central outboard engine 110B are determined. The EMM 50A which has been previously inputted a distance 130 between the outboard engines 110A, 100C and the outboard engine 110B calculates the limit position between the two outboard engine 110A, 110B (or between the two outboard engines 110C, 110B) beyond which the outboard engines 110A, 110B (resp. 110C 110B) interfere with each other. It is contemplated that step 606 could be performed before step 602 or before step 604. It is contemplated that step 606 could be determining either the port limit position of the starboard outboard engine 110A or the starboard limit position of the port outboard engine 110C.

At step 608, the port and starboard limit positions of every outboard engine 110A, 110B, 110C is determined. The EMMs 50A, 50B, 50C communicating with each other, the port and starboard limit positions of the outboard engines 110A, 110B, 110C found at steps 602, 604, 606 are compared, and the smallest of these limits is attributed to be the port and starboard limit positions of every outboard engine 110A, 110B, 110C. It is contemplated that the step 608 could be omitted and that the port limit position of the starboard outboard engine 110A could be the port limit position of the central outboard engine 110B, and the starboard limit position of the port outboard engine 110B could be the starboard limit position of the central outboard engine 110C.

At step 610, the EMMs 50A, 50B, 50C respectively assign the port and starboard limit positions determined at the step 608 to the outboard engines 110A, 110B, 110C.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A method for limiting a tilting motion of an outboard engine of a watercraft to at least one desired limit position, the outboard engine moving about a generally horizontal tilt axis, the watercraft having an electronic module (EM) controlling the tilting motion of the outboard engine, the method comprising:

inputting a sequence of at least one state of at least one switch, the at least one switch being disposed on the outboard engine, the at least one switch being operatively connected to the EM, the at least one switch having at least two states, the at least one switch being in the at least one state for at least one period of time, the EM initiating a calibration process for the at least one desired limit position in response to the input sequence;

after the calibration process has been initiated, moving the outboard engine about the tilt axis in one direction until the at least one desired limit position is reached;

sensing an angular position of the outboard engine about the tilt axis by a sensor when the outboard engine is at the at least one desired limit position; and recording the sensed position of the outboard engine to be a limit position of the outboard engine about the tilt axis in the one direction.

2. The method of claim 1, wherein the sensed position is recorded when the outboard engine has been stationary about the tilt axis and the at least one switch has remained in a same state for a predetermined period of time.

3. The method of claim 1, wherein the outboard engine is moved about the tilt axis by actuating the at least one switch to send a signal to an actuator to move the outboard engine about the tilt axis.

4. The method of claim 1, wherein the EM is an electronic management module (EMM); and the EMM controls at least in part an engine of the outboard engine.

5. The method of claim 1, wherein the outboard engine is moved about the tilt axis in response to the calibration process being initiated.

6. The method of claim 1, further comprising indicating that the limit position of the outboard engine has been recorded by the EM.

7. The method of claim 1, further comprising indicating that the calibration process has been initiated.

8. The method of claim 1, wherein one of the at least two states of the at least one switch corresponds to the outboard engine being stationary about the tilt axis in response to the at least one switch being in the one of the at least two states.

9. A watercraft having:
a hull;
at least one outboard engine movably connected to the hull, the at least one outboard engine being moveable about at least one axis;
an electronic module (EM) operatively connected to the at least one outboard engine, the EM adapted to control a motion of the at least one outboard engine about the at least one axis;
a sensor connected to the at least one outboard engine, the sensor sensing an angular position of the at least one outboard engine about the at least one axis;
at least one switch operatively connected to the EM, the at least one switch being disposed on the outboard engine, the at least one switch having a first state and a second state,
when the at least one switch is in the second state, the at least one outboard engine is moving in one direction about the at least one axis;
when the at least one switch is in the first state, the at least one outboard engine is stationary in the one direction about the at least one axis; and
the EM initiating a calibration process in response to a predetermined sequence of states of the at least one switch, during the calibration process, the EM recording the angular position of the at least one outboard engine about the at least one axis sensed by the sensor.

10. The method of claim 1, wherein the sequence of at least one state of at least one switch is a predetermined sequence.

11. The method of claim 1, wherein the at least one switch is disposed on a cowling of the outboard engine.

12. The watercraft of claim 9, wherein the at least one switch is disposed on a cowling of the outboard engine.

\* \* \* \* \*